(12) United States Patent
Hwang et al.

(10) Patent No.: US 12,284,511 B2
(45) Date of Patent: Apr. 22, 2025

(54) ELECTRONIC APPARATUS AND CONTROLLING METHOD THEREOF

(71) Applicant: SAMSUNG ELECTRONICS CO., LTD., Suwon-si (KR)

(72) Inventors: Sungjun Hwang, Suwon-si (KR); Daewung Kim, Suwon-si (KR); Euijun Kim, Suwon-si (KR); Jiyeon Ma, Suwon-si (KR); Donghun Shin, Suwon-si (KR); Dahye Shim, Suwon-si (KR); Youngah Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 227 days.

(21) Appl. No.: 17/987,333

(22) Filed: Nov. 15, 2022

(65) Prior Publication Data

US 2023/0094993 A1    Mar. 30, 2023

Related U.S. Application Data

(63) Continuation of application No. PCT/KR2022/010521, filed on Jul. 19, 2022.

(30) Foreign Application Priority Data

Sep. 17, 2021 (KR) .................. 10-2021-0124993

(51) Int. Cl.
*H04W 12/02* (2009.01)
*G06F 21/60* (2013.01)
(Continued)

(52) U.S. Cl.
CPC .......... *H04W 12/02* (2013.01); *G06F 21/606* (2013.01); *G06F 21/6254* (2013.01); *G06F 21/6263* (2013.01); *G06Q 10/10* (2013.01)

(58) Field of Classification Search
CPC .... H04W 12/02; H04L 63/0421; H04L 51/08; H04N 5/262; H04N 7/147; H04N 7/14; (Continued)

(56) References Cited

U.S. PATENT DOCUMENTS 10,474,842 B2  11/2019  Iwanami et al.
11,100,249 B2   8/2021  Suh et al.
(Continued)

FOREIGN PATENT DOCUMENTS

CN    104834866 A    8/2015
CN    110502974 A   11/2019
(Continued)

OTHER PUBLICATIONS

International Search Report issued in International Application No. PCT/KR2022/010521 dated Oct. 28, 2022.
(Continued)

*Primary Examiner* — Kyung H Shin
(74) *Attorney, Agent, or Firm* — STAAS & HALSEY LLP

(57) ABSTRACT

An electronic apparatus is provided. The electronic apparatus including a memory in which security information for each of a plurality of privacy levels is stored, a camera and a processor connected to the memory and the camera to control the electronic apparatus, and the processor is configured to, based on an application which involves using the camera being executed, identify a privacy level among the plurality of privacy levels based on context information related to use of the application and perform image processing in association with an image obtained through the camera so that information corresponding to the identified privacy level from a plurality of pieces of information included in the image is processed in a secure manner.

19 Claims, 15 Drawing Sheets

(51) Int. Cl.
*G06F 21/62* (2013.01)
*G06Q 10/10* (2023.01)

(58) Field of Classification Search
CPC ...... G06F 21/64; G06F 21/6245; G06F 21/31; G06F 21/6218; G06F 21/604; G06F 21/6209; G06Q 10/10; G06V 40/197; G06V 40/171; G06V 40/193; G06V 40/172; G10L 17/02
See application file for complete search history.

(56) References Cited

U.S. PATENT DOCUMENTS

| | | |
|---|---|---|
| 2014/0283100 A1 | 9/2014 | Harrison |
| 2016/0055343 A1* | 2/2016 | Coard ................ G06Q 10/10 726/7 |
| 2020/0334386 A1 | 10/2020 | Lawrenson et al. |
| 2021/0312090 A1* | 10/2021 | Iwanami ............. H04W 12/02 |

FOREIGN PATENT DOCUMENTS

| | | | |
|---|---|---|---|
| CN | 113257254 A | * | 8/2021 |
| JP | 4475579 | | 6/2010 |
| JP | 2020-156033 A | | 9/2020 |
| KR | 10-2007-0058140 A | | 6/2007 |
| KR | 10-2015-0044633 A | | 4/2015 |
| KR | 10-2016-0089711 A | | 7/2016 |
| KR | 10-2021-0101621 A | | 8/2021 |
| WO | WO 2016/072118 A1 | | 5/2016 |
| WO | WO-2021072673 A1 | * | 4/2021 |

OTHER PUBLICATIONS

Written Opinion issued in International Application No. PCT/KR2022/010521 dated Oct. 28, 2022.

* cited by examiner

ELECTRONIC APPARATUS AND CONTROLLING METHOD THEREOF

CROSS-REFERENCE TO RELATED APPLICATIONS

This application is a continuation application, under 35 U.S.C. § 111 (a), of International Patent Application No. PCT/KR2022/010521, filed on Jul. 19, 2022, which claims priority under 35 U.S.C. 119 to Korean Patent Application No. 10-2021-0124993, filed on Sep. 17, 2021, in the Korean Intellectual Property Office, the disclosures of which are incorporated herein by reference in their entirety.

BACKGROUND

1. Field

Aspects of the exemplary embodiments relate to an electronic apparatus and a controlling method thereof and more particularly, to an electronic apparatus for protecting user privacy and a controlling method thereof.

2. Description of the Related Art

With the development of electronic technology, various types of devices are being developed and popularized. In particular, recently released devices have a camera and provide various interactive functions using the camera.

For example, as illustrated in FIG. 1A, an electronic device may include a camera and provide a video call function with another person. Alternatively, as illustrated in FIG. 1B, an electronic device may photograph a user through a camera and assist the user in learning by simultaneously displaying an image captured by the user and a learning image through a display.

In addition, various services using a camera are provided.

However, an image capturing a user through a camera installed in the house may be leaked, which may infringe on the user privacy.

In order to solve such a privacy issue, the user may put on a cover on the camera, but there is a problem in that it may cause inconvenience to the user and compromise the appearance.

In addition, a device having a button for physically blocking the entrance to the camera or a device for providing the operating state of the camera with an LED have been developed, but there is a problem in that such a device may cause inconvenience to the user.

Accordingly, there is a need to develop a method that does not infringe on user privacy while improving user convenience.

SUMMARY

An electronic apparatus according to an embodiment includes a memory to store security information for each of a plurality of privacy levels, respectively, a camera and a processor connected to the memory and the camera to control the electronic apparatus, and the processor is configured to, based on an application which involves using the camera being executed, identify a privacy level among the plurality of privacy levels based on context information related to use of the application and perform image processing in association with an image obtained through the camera so that information corresponding to the identified privacy level from a plurality of pieces of information included in the image is processed in a secure manner.

The application involves using a video call application by a first user; and wherein the processor is configured to: identify a second user associated with the video call with the first user through the video application; and identify a respective privacy level among the plurality of privacy levels based on information regarding the identified second user.

The memory stores information regarding a plurality of other users; wherein the processor is configured to: based on the second user being one of the plurality of other users, identify a first privacy level from among the plurality of privacy levels; and based on the second user not being one of the plurality of other users, identify a second privacy level with more enhanced security than the first privacy level from among the plurality of privacy levels.

The processor is configured to: obtain a plurality of images sequentially through the camera; and identify information regarding a user of the electronic apparatus by analyzing the plurality of images.

The processor is configured to, based on the user not being identified in consecutive images of a predetermined number or more from among the plurality of images, change the identified privacy level to a privacy level with more enhanced security than the identified privacy level.

The apparatus is further comprising: a user interface, wherein the processor is configured to, based on a user command being input through the user interface, change the identified privacy level to a privacy level corresponding to the user command.

The processor is configured to: based on the identified privacy level being a first privacy level, blurring a partial area of the image; and based on the identified privacy level being a second privacy level with more enhanced security than the first privacy level, blurring an entire area of the image.

The processor is configured to, based on the identified privacy level being the first privacy level, blurring an area excluding a user of the electronic apparatus in the image or blurring an area including private information of the user.

The processor is configured to: based on the identified privacy level being equal to or greater than a threshold level, identify a user of the electronic apparatus in the image: and change an area in which the user is identified to a predetermined image.

The processor is configured to provide the image-processed image to the application.

The apparatus is further comprising: a microphone, wherein the processor is configured to, based on the identified privacy level being equal to or greater than a threshold level and a sound of a second another user is input through the microphone, not providing a sound during a time period in which the sound of the second another user is input to the application.

A method of a respective privacy level among an electronic apparatus according to an embodiment includes, based on an application which involves using the camera being executed, identifying a privacy level among a plurality of privacy levels based on context information related to the application, and performing image processing in association with an image obtained through the camera so that information corresponding to the identified privacy level from among a plurality of pieces of information included in the image is processed in a secure manner.

The application involves using a video call application by a first user; and wherein the identifying comprises: identifying a second user associated with the video call with the first user through the video application; and identifying a respective privacy level among the plurality of privacy levels based on information regarding the identified second user.

The identifying comprises: based on information regarding the second user being stored in the electronic apparatus, identifying a first privacy level from among the plurality of privacy levels; and based on information regarding the second user not being stored in the electronic apparatus, identifying a second privacy level with more enhanced security than the first privacy level from among the plurality of privacy levels.

The method is further comprising: obtaining a plurality of images sequentially through the camera; and identifying information regarding a user of the electronic apparatus by analyzing the plurality of images.

DETAILED DESCRIPTION

Figure 1A:
FIG. 1A is a view illustrating prior art technology provided to help understanding of the present disclosure.
Figure 1B:
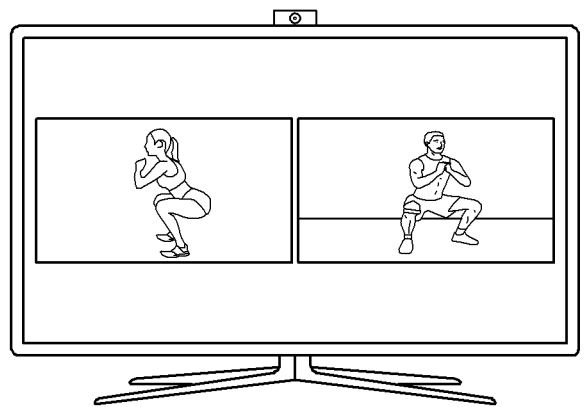
FIG. 1B is a view illustrating prior art technology provided to help understanding of the present disclosure.
Figure 1B:
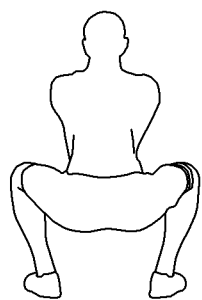

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Hereinafter, the present disclosure will be described in detail with reference to accompanying drawings.

General terms that are currently widely used were selected as terms used in embodiments of the disclosure in consideration of functions in the disclosure, but may be changed depending on the intention of those skilled in the art or a judicial precedent, an emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the terms.

In the disclosure, an expression "have", "may have", "include", "may include", or the like, indicates an existence of a corresponding feature (e.g., a numerical value, a function, an operation, a component such as a part, or the like), and does not exclude an existence of an additional feature.

Expressions such as "A or/and B" should be understood to mean one of "A", "B" or "A and B".

Expressions "first", "second", and the like, used in the disclosure may indicate various components regardless of a sequence and/or importance of the components, will be used only in order to distinguish one component from the other components, and do not limit the corresponding components.

Singular forms used herein are intended to include plural forms unless explicitly indicated otherwise. It is to understood that terms 'comprise' or 'include' used in the specification, specify the presence of features, numerals, steps, operations, components, parts mentioned in the present specification or combinations thereof, but do not preclude the presence or addition of one or more other features, numerals, steps, operations, components, parts or combinations thereof.

In the disclosure, a term "user" may refer to a person using an electronic apparatus or an apparatus (for example, an artificial intelligence electronic apparatus) using an electronic apparatus.

The disclosure has been made to solve the above-described problem, and an object of the disclosure is to provide an electronic apparatus that provides a service using a camera without infringing a user's privacy and a controlling method thereof.

According to various embodiments as shown above, the electronic apparatus may process an image for security of information included in the image obtained through a camera and provide the processed image to an application to protect the user's privacy.

In addition, the electronic apparatus may improve user convenience by processing an image differently according to a plurality of privacy levels.

Hereinafter, an embodiment of the present disclosure will be described in greater detail with reference to accompanying drawings.

Figure 2:
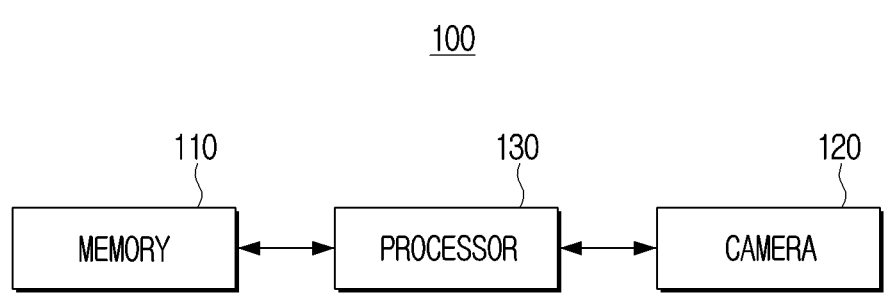
FIG. 2 is a block diagram illustrating configuration of an electronic apparatus according to an embodiment.

FIG. 2 is a block diagram illustrating configuration of an electronic apparatus 100 according to an embodiment. The electronic apparatus 100 includes a memory 110, a camera 120 and a processor 130 as illustrated in FIG. 2.

The electronic apparatus 100 may be an apparatus that provides a service using the camera 120. For example, the electronic apparatus 100 is an apparatus in which an application using the camera 120 is installed, and may be implemented as a desktop PC, a notebook PC, a TV, a smartphone, a tablet PC, a wearable device, etc. However, the electronic apparatus 100 is not limited thereto, and the electronic apparatus 100 may be any apparatus that provides a service using the camera 120.

The memory 110 may refer to hardware that stores information such as data in an electrical or magnetic form so that the processor 130 can access it. To do so, the memory 110 may be implemented as at least one hardware from among non-volatile memory, volatile memory, flash memory, hard disk drive (HDD) or solid state drive (SSD), RAM, ROM, etc.

The memory 110 may store at least one instruction or module required for the operation of the electronic apparatus 100 or the processor 130. Here, the instruction is a code unit for instructing the operation of the electronic apparatus 100 or the processor 130, and may be written in machine language that can be understood by a computer. A module may be a set of instructions that perform a specific task of a unit of work.

The memory 110 may store data that is information in units of bits or bytes which can represent characters, numbers, images and the like. For example, the memory 110 may store security information for each of a plurality of privacy levels.

The memory 110 may store an image processing module, a privacy level module, at least one application, a contact module, etc.

The memory 110 may be accessed by the processor 130, and reading/recording/modifying/deleting/updating of instructions, modules or data may be performed by the processor 130.

The camera 120 is configured to photograph a still image or a moving image under the control of a user. The camera 120 may photograph a still image at a specific time point or may photograph a still image continuously.

The camera 120 includes a lens, a shutter, an aperture, a solid-state imaging device, an Analog Front End (AFE), and a Timing Generator (TG). The shutter controls the amount of time that light reflected from a subject enters the camera 120, and the aperture adjusts the amount of light incident on the lens by mechanically increasing or decreasing the size of an opening through which light enters. The solid state imaging device, when light reflected from a subject is accumulated as photocharges, outputs an image by the photocharges as an electrical signal. The TG outputs a timing signal for reading out pixel data of the solid state imaging device, and the AFE samples and digitizes the electrical signal output from the solid state imaging device.

The processor 130 controls the overall operations of the electronic apparatus 100. Specifically, the processor 130 may be connected to each component of the electronic apparatus 100 to control the overall operations of the electronic apparatus 100. For example, the processor 130 may be connected to a component such as the memory 110, the camera 120, a user interface (not shown), a display (not shown), and the like to control the operations of the electronic apparatus 100.

The processor 130 according to an embodiment may be implemented as one of a digital signal processor (DSP) for processing digital image signals, a microprocessor, or a time controller (TCON), but is not limited thereto. The processor 130 may include at least one of a central processing unit (CPU), a micro controller unit (MCU), a micro processing unit (MPU), a controller, an application processor (AP), a communication processor (CP) or an ARM processor, or may be defined as the corresponding term. Further, the processor 130 may be implemented as a System on Chip (SoC) integrated with a processing algorithm, a large scale integration (LSI), or in the form of a field programmable gate array (FPGA).

When an application using the camera 120 is executed, the processor 130 may identify one of a plurality of privacy levels based on context information related to the application.

For example, when a first application using the camera 120 is executed, the processor 130 may identify a first privacy level corresponding to the type of the first application, and when a second application using the camera 120 is executed, the processor 130 may identify a second privacy level corresponding to the type of the second application. In the above-described example, the type of application is taken as an example of context, but the context is not limited to thereto. For example, the context may be a concept including all application-related situations such as the type of application, the user's application use state, the application use time, the use state of an image acquired through the camera, etc. However, the processor 130 may not identify a privacy level based on all application-related situations, but may identify a privacy level based on at least one situation related to the application, which will be explained in greater detail later.

The processor 130 may perform image-processing on an image so that information corresponding to the identified privacy level from among a plurality of pieces of information included in the image acquired through the camera 120 is processed for security. For example, if it is identified that the privacy level is a first privacy level, the processor 130 may blur the entire image, and if it is identified that the privacy level is a second privacy level, the processor 130 may blur only the user in the image.

If the application is a video call application, the processor 130 may identify a first another user that performs a video call through the video call application and identify one of a plurality of privacy levels based on information regarding the identified first another user.

For example, the memory 120 may store information regarding a plurality of other users, and if the first another user is one of the plurality of other users, the processor 130 may identify a first privacy level from among a plurality of privacy levels, and if the first another user is not one of the plurality of privacy levels, the processor 130 may identify a second privacy level with more enhanced security than the first privacy level from among the plurality of privacy levels. In other words, if the first another user who is currently on the video call is not stored in the electronic apparatus 100, the processor 130 may identify that intimacy with the user is not so strong and apply a privacy level with enhanced security.

Meanwhile, the processor 130 may sequentially obtain a plurality of images through the camera 120, and identify information regarding a user of the electronic apparatus 100 by analyzing the plurality of images. If the user is not identified in a predetermined number or more of consecutive images from among the plurality of images, the processor 130 may change the identified privacy level to a privacy level with more enhanced privacy than the identified privacy level. In other words, when the user is away, the processor 130 may prevent the user's space from being disclosed.

However, the present invention is not limited thereto, and the processor 130 may change the privacy level based on the user's posture. For example, if the user sleeps on his or her stomach during a video call, the processor 130 may change the privacy level to a privacy level with enhanced security as the user's face is not identified for a predetermined time.

Alternatively, the processor 130 may change the privacy level based on the user's facial expression. For example, if the user's smile is identified more than a threshold number of times, the processor 130 may identify that the first another user who is currently on a video call has strong intimacy with the user and change the privacy level with a privacy level with weakened security.

Meanwhile, the electronic apparatus 100 may further include a user interface, and when a user command is input through the user interface, the processor 130 may change the identified privacy level to a privacy level corresponding to the user command.

If the identified privacy level is the first privacy level, the processor 130 may blur a partial area of an image, and if the identified privacy level is the second privacy level with enhanced security than the first privacy level, the processor 130 may blur the entire area of the image.

Here, if the identified privacy level is the first privacy level, the processor 130 may blur an area excluding the user of the electronic apparatus 100 in the image or blur an area including the user's personal information.

However, the present disclosure is not limited thereto, and there may be various kinds of image-processing methods. For example, if the identified privacy level is the first privacy level, the processor 130 may pixelate a partial area of the image, and if the identified privacy level is the second privacy level with more enhanced security level than the first privacy level, the processor 130 may pixelate the entire area of the image.

Alternatively, the processor 130 may not blur or pixelate a partial area or the entire area and instead, may replace it with another image. Alternatively, the processor 130 may perform image-processing on the image through a neural network model. For example, the processor 130 may perform image-processing on the image through a neural network model that performs image-processing in a Renaissance style. Here, the neural network model may be trained to blur important information. In addition, any image processing method that can protect the user's privacy may be used.

If the identified privacy level is equal to or greater than the threshold level, the processor 130 may identify the user of the electronic apparatus 100 in the image and change the area in which the user is identified to a predetermined image. For example, if the identified privacy level is equal to or greater than the threshold level, the processor 130 may identified the user of the electronic apparatus 100 in the image and change the area in which the user is identified to an avatar image of the user.

Meanwhile, the processor 130 may provide an image-processed image to an application. In other words, the user's privacy may be protected as the application cannot receive the original image and receives an image which is processed for security.

Meanwhile, the electronic apparatus 100 further includes a microphone, and if the identified privacy level is equal to or greater than the threshold level and sound of a second another user is input through the microphone, the processor 130 may not provide sound of the period in which the sound of the second another user is input, to the application.

However, the present disclosure is not limited thereto, and the processor 130 may provide the application with neither the sound of the period in which the sound of the second another user is input nor the image. Alternatively, the processor 130 may remove the sound of the second another user from the sound input through the microphone and provide only the remaining sound to the application.

Meanwhile, the function related to the artificial intelligence according to an embodiment is operated through the processor 130 and the memory 110.

The processor 130 may comprise one processor or a plurality of processors. In this case, the one or the plurality of processors may be a general-purpose processor such as Central Processing Unit (CPU), Application Processor (AP), Digital Signal Processor (DSP), etc., a graphics-only processor such as Graphics Processing Unit (GPU) and Vision Processing Unit (VPU), or an artificial intelligence-only processor such as Neural Processing Unit (NPU).

One or a plurality of processors control to process input data according to a predefined operation rule stored in a memory or an artificial intelligence model. Alternatively, if one or a plurality of processors are AI-only processors, the AI-only processors may be designed in a hardware structure specialized for processing a specific artificial intelligence model. The predefined operation rule or the artificial intelligence model is characterized by being created through learning.

Here, being created through learning means creating a predefined operation rule or an artificial intelligence model that is set to perform a desired characteristic (or purpose) as a basic artificial intelligence model is trained by a learning algorithm using a plurality of learning data. Such learning may be conducted in an apparatus itself where artificial intelligence according to an embodiment is performed, or may be conducted through a separate server and/or system. The examples of the learning algorithm include supervised learning, unsupervised learning, semi-supervised learning or reinforcement learning, but are not limited thereto.

The artificial intelligence model may be composed of a plurality of neural network layers. Each of the plurality of neural network layers has a plurality of weight values, and performs a neural network operation through operation between a result of operation of the previous layer and the plurality of weight values. The plurality of weight values of the plurality of neural network layers may be optimized by a learning result of the artificial intelligence model. For example, the plurality of weight values may be updated so that a loss value or a cost value obtained from the artificial intelligence model during the learning process is reduced or minimized.

The artificial neural network may include a Deep Neural Network (DNN) and for example, may be a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep Q-Networks, etc. However, the artificial neural network is not limited to the above-mentioned examples.

Figure 3:
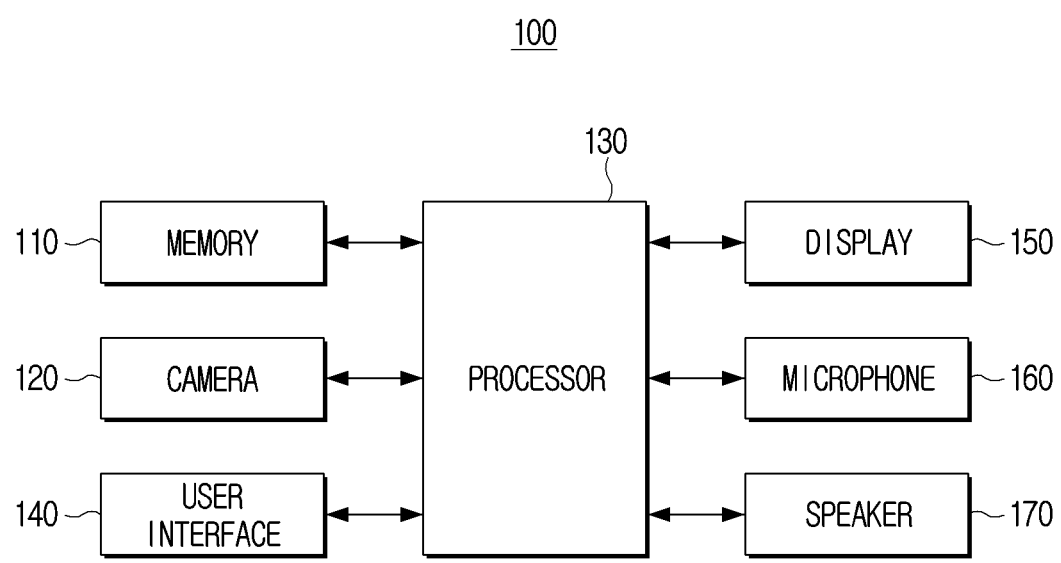
FIG. 3 is a block diagram illustrating detailed configuration of an electronic apparatus according to an embodiment.

FIG. 3 is a block diagram illustrating detailed configuration of the electronic apparatus 100 according to an embodiment. The electronic apparatus may include the memory 110, the camera 120 and the processor 130. In addition, referring to FIG. 3, the electronic apparatus 100 may further include a user interface 140, a display 150, a microphone 160, and a speaker 170. Among the components illustrated in FIG. 3, detailed description of the components that are overlapped with those illustrated in FIG. 2 will be omitted.

The user interface 140 may be implemented as a button, a touch pad, a mouse, a keyboard, etc. or may be implemented as a touch screen capable of performing a display function and a manipulation input function. Here, the button may be various types of buttons such as a mechanical button, a touch pad, a wheel, etc. which are formed on a certain area of the front, side, or rear of the external surface of the main body of the electronic apparatus 100.

The display 150 may be implemented as displays in various forms such as Liquid Crystal Display (LCD), Organic Light Emitting Diodes (OLED) display, Plasma Display Panel (PDP), etc. The display 150 may also include a driving circuit, a backlight circuit, etc. that can be implemented in the form of a-si TFT, low temperature poly silicon (LTPS) TFT, organic TFT (OTFT), etc. Meanwhile, the display 150 may be implemented as a touch screen combined with a touch sensor, a flexible display, a 3D display, etc.

The microphone 160 is configured to receive sound and convert the sound into an audio signal. The microphone 160 may be electrically connected to the processor 130, and receive sound under the control of the processor 130. Here, the sound may include a sound generated from at least one of the electronic apparatus 100 of other apparatuses around the electronic apparatus 100 and a noise around the electronic apparatus 100.

For example, the microphone 160 may be formed to be integrated in the direction of the upper side, the front side, the lateral side, etc. Alternatively, the microphone 160 may be provided in a remote controller separate from the electronic apparatus 100. In this case, the remote controller may receive sound through the microphone 160, and provide the received sound to the electronic apparatus 100.

The microphone 160 may include various components such as a microphone for collecting sound in analog form, an amplifier circuit for amplifying the collected sound, an A/D conversion circuit for sampling the amplified sound and converting it into a digital signal, a filter circuit for removing a noise component from the converted digital signal, etc.

Meanwhile, the microphone 160 may be implemented in the form of a sound sensor, and it may be provided in any form as long as it can collect sound.

The speaker 170 is a component that outputs not only various audio data processed by the processor 130 but also various notification sound, voice messages, etc. Meanwhile, the electronic apparatus 100 may further include a communication interface (not illustrated).

The communication interface is configured to perform communication with various types of external devices according to various types of communication methods. For example, the electronic apparatus 100 may perform communication with a server 200 through the communication interface.

The communication interface may include a WiFi module, a Bluetooth module, an infrared communication module, a wireless communication module, etc. Here, each communication module may be implemented in the form of at least one hardware chip.

The WiFi module and the Bluetooth module perform communication through a WiFi method and a Bluetooth method, respectively. When using the WiFi module or the Bluetooth module, various connection information such as SSID, session keys, etc. are transmitted and received first, and various information can be transmitted and received after communication is established using the same. The infrared communication module performs communication according to an infrared Data Association (IrDA) technology using infrared light which lies between visible light and millimeter waves for short-distance wireless data transmission The wireless communication module may include at least one communication chip that performs communication according to various wireless communication standards such as Zigbee, 3rd generation (3G), 3rd generation partnership project (3GPP), long term evolution (LTE), LTE Advanced (LTE-A), 4th generation (4G), and 5th generation (5G), other than the above-described communication methods.

In addition, the communication interface may include a wired communication interface such as HDMI, DP, thunderbolt, USB, RGB, D-SUB, DVI, etc.

Further, the communication interface may include at least one of a local area network (LAN) module, an Ethernet module, or a wired communication module performing communication by using a pair cable, a coaxial cable, an optical fiber cable, or the like.

As such, the processor 130 may protect the user's privacy by processing an image and providing the processed image to an application.

Hereinafter, the operation of the electronic apparatus 100 will be described in greater detail with reference to FIGS. 4 to 13. In FIGS. 4 to 13, individual embodiments will be described for convenience of explanation. However, the individual embodiments of FIGS. 4 to 13 may be implemented in combination.

Figure 4:
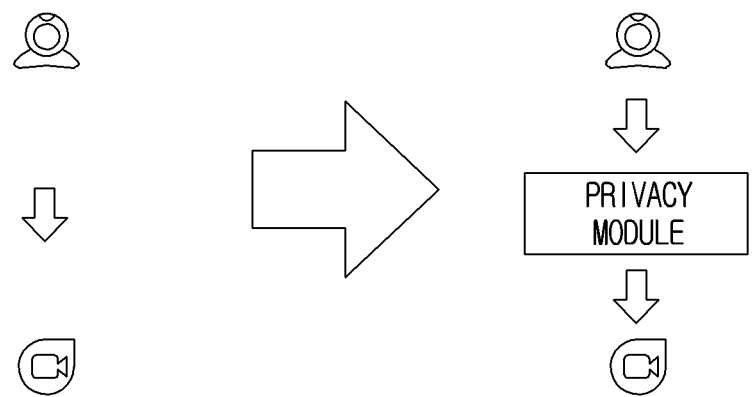
FIG. 4 is a view provided to explain a privacy module according to an embodiment.

FIG. 4 is a view provided to explain a privacy module according to an embodiment.

Conventionally, as shown in the left side of FIG. 4, an image obtained through a camera is provided directly to an application.

On the other hand, according to the present disclosure, as shown in the right side of FIG. 4, an image obtained through the camera 120 may be provided to an application after going through a privacy module. The privacy module may perform image processing on the image according to a privacy level and then, provide the image-processed image to an application.

The privacy module may be implemented as software, and the processor 130 may identify a privacy level by executing the privacy module, perform image processing on an image based on the identified privacy level and provide the image-processed image to an application.

Alternatively, the privacy module may be implemented as hardware. For example, the privacy module may be implemented in a state in which it is connected between an input/output terminal of the camera 120 and the processor 130.

Figure 5:
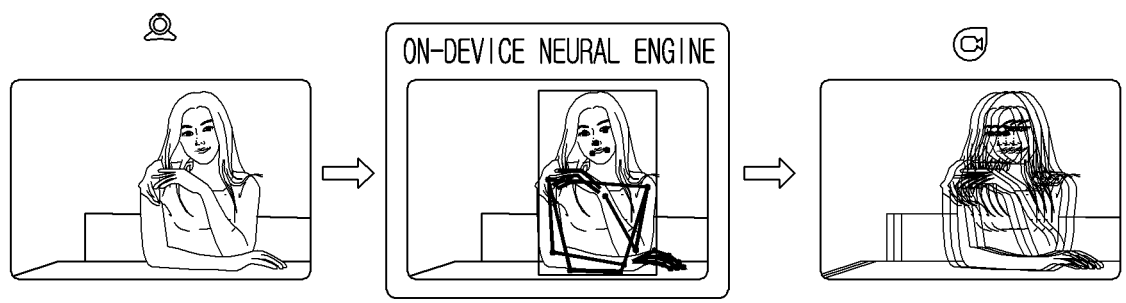
FIG. 5 is a view provided to explain a method of identifying a user status according to an embodiment.

FIG. 5 is a view provided to explain a method of identifying a user status according to an embodiment.

The processor 130 may identify a user status in order to identify a privacy level. For example, as illustrated in the middle of FIG. 5, the processor 130 identifies the user status through a neural network model for identifying the user status and when it is determined that the user's privacy needs to be protected, may blur the entire image and provide the blurred image to an application as illustrated in the right side of FIG. 5.

However, the present disclosure is not limited thereto, and the processor 130 may identify the user status without using a neural network model. For example, the processor 130 may identify whether the user pays attention to the electronic apparatus 100 by identifying the user's eyes and gaze and if the user's attention to the electronic apparatus 100 is not maintained, may blur at least part of the image.

FIGS. 6 to 9 are views provided to explain an image processing method according to an embodiment.

Figure 6:
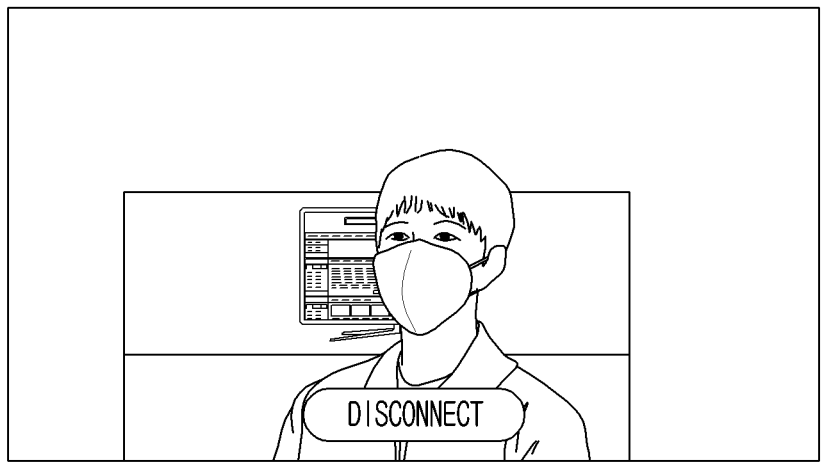
FIGS. 6 to 9 are views provided to explain an image processing method according to an embodiment.

The processor 130 may perform image processing on an image based on an identified privacy level. For example, as illustrated in FIG. 6, if a security level is a first privacy level which is the lowest privacy level, the processor 130 may provide the image without performing image processing.

Figure 7:
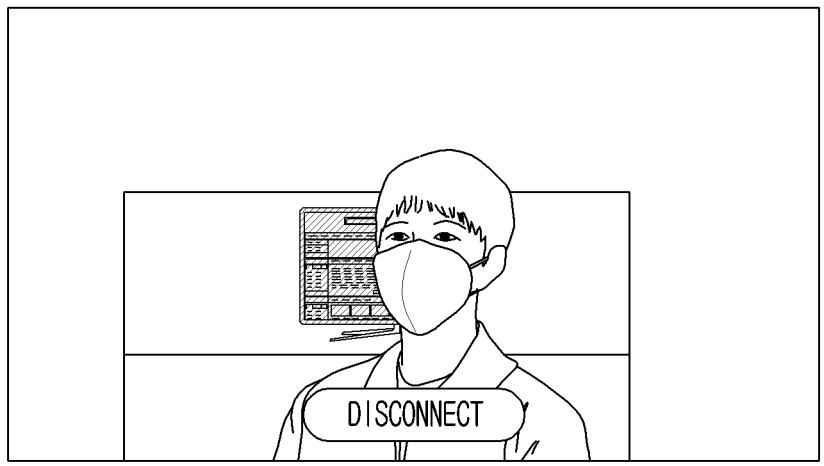

Alternatively, as illustrated in FIG. 7, if the security level is a second privacy level which is higher than the first privacy level, the processor 130 may diagonally process the area identified as the user's privacy information to protect the user privacy.

Figure 8:

Alternatively, as illustrated in FIG. 8, if the security level is a third privacy level which is higher than the second privacy level, the processor 130 may protect the user privacy by removing the remaining areas excluding the user in the image.

Figure 9:
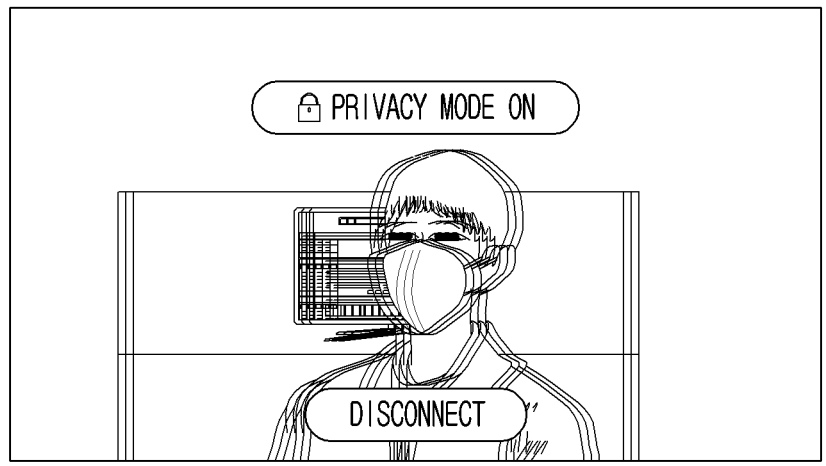

Alternatively, as illustrated in FIG. 9, if the security level is a fourth privacy level which is higher than the third privacy level, the processor 130 may blur the entire image to protect the user privacy.

As such, the privacy level may be set in various ways. For example, the privacy level may be set for each application. In addition, the privacy level may be changed for reasons such as absence of the user while using the application. Further, when a video call is connected to a first another user as in a video call application, the privacy level may be changed based on the first another user. For example, the privacy level may vary depending on whether the another is a friend or a coworker. Further, the privacy level may be changed when the application is terminated.

FIGS. 6 to 9 are only embodiments, and there may be various image processing. For example, the processor 130 may blur the user area of the image.

Figure 10:
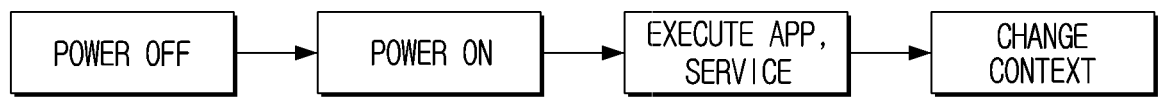
FIG. 10 is a view provided to explain an operation of changing a privacy level according to an embodiment.

FIG. 10 is a view provided to explain an operation of changing a privacy level according to an embodiment.

If the electronic apparatus 100 is turned on in a state where the power is turned off, the processor 130 may identify a predetermined privacy level.

Subsequently, when an application is executed, the processor 130 may identify a privacy level corresponding to the application. For example, if an application that does not user the camera 120 is executed while it is the first privacy level, the processor 130 may maintain the first privacy level. Afterwards, if a training application using the camera 120 is used while it is the first privacy level, the processor 130 may change the first privacy level to the second privacy level of which security level is higher than the first privacy level. Subsequently, if a video call application is executed while it is the second privacy level, the processor 130 may change the privacy level to the third privacy level of which security level is higher than the second privacy level. Since the video call application transmits an image to the outside of the electronic apparatus 100, the security of the video call application may be higher than the training application that simply uses the camera 120.

Subsequently, the processor 130 may change the privacy level based on a context associated with an application. In the above example, when a video call is connected to the first another user, the processor 130 may change the privacy level based on the first another user. For example, if information regarding the first another user is stored in the electronic apparatus 100, the processor 130 may maintain the third privacy level, but if information regarding the first another user is not stored in the electronic apparatus 100, the processor 130 may change the privacy level to the fourth privacy level of which security level is higher than the third privacy level.

Subsequently, when the application is terminated, the processor 130 may change the privacy level to the predetermined privacy level. In the above example, when the video call application is terminated while it is the third privacy level of the fourth privacy level, the processor 130 may change the privacy level to the first privacy level.

Figure 11:
FIG. 11 is a view provided to explain a background image processing method according to an embodiment.

FIG. 11 is a view provided to explain a background image processing method according to an embodiment.

If the identified privacy level is equal to or greater than a threshold level, the processor 130 may identify a user of the electronic apparatus 100 in an image and change the area excluding the user to a predetermined image.

Alternatively, if the application that is being executed is a video call application and the counterpart of the video call is a coworker, the processor 130 may change the area excluding the user to a predetermined image.

Through such an operation, the user may protect the privacy of the user's space.

Figure 12:
FIG. 12 is a view provided to explain a user area processing method according to an embodiment.

FIG. 12 is a view provided to explain a user area processing method according to an embodiment.

If the identified privacy level is equal to or greater than a threshold level, the processor 130 may identify a user of the electronic apparatus 100 in an image and change the area in which the user is identified to a predetermined image.

Alternatively, if the application that is being executed is a video call application and the counterpart of the video call is a friend, the processor 130 may change the area in which the user is identified to a predetermined image. Alternatively, if the application that is being executed is a video call application and there is no information regarding the counterpart of the video call, the processor 130 may also change the area in which the user is identified to a predetermined image.

For example, as illustrated in FIG. 12, if the identified privacy level is equal to or greater than a threshold level, the processor 130 may identify the user of the electronic apparatus 100 and change the area in which the user is identified to an avatar.

In this case, the processor 130 may provide a graphic effect based on the user's body motion. For example, as illustrated in FIG. 12, the processor 130 may provide the effect of 'Victory' based on the user's left hand operation.

Figure 13:
FIG. 13 is a view provided to explain a sound processing method according to an embodiment.
Figure 13:
Figure 13:
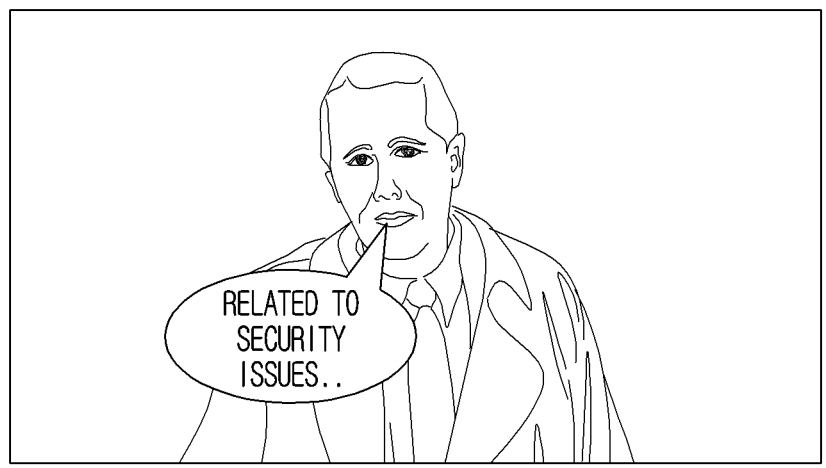
Figure 13:

FIG. 13 is a view provided to explain a sound processing method according to an embodiment.

If the identified privacy level is equal to or greater than a threshold level and the sound of a second another user is input through the microphone 160, the processor 130 may not provide the sound of a time section during which the sound of the second another user is input, to an application.

Alternatively, if the identified privacy level is equal to or greater than a threshold level and the sound of the second another user is input through the microphone 160, the processor 130 may further process an image. For example, if the sound of the second another user is input through the microphone 150 while an image that is not processed is provided to an application, the processor 130 may identify the user in the image and provide the image to the application after blurring the area excluding the user. Subsequently, if the sound of the second another user is not input, the processor 130 may provide the image to the application without processing the image.

Figure 14:
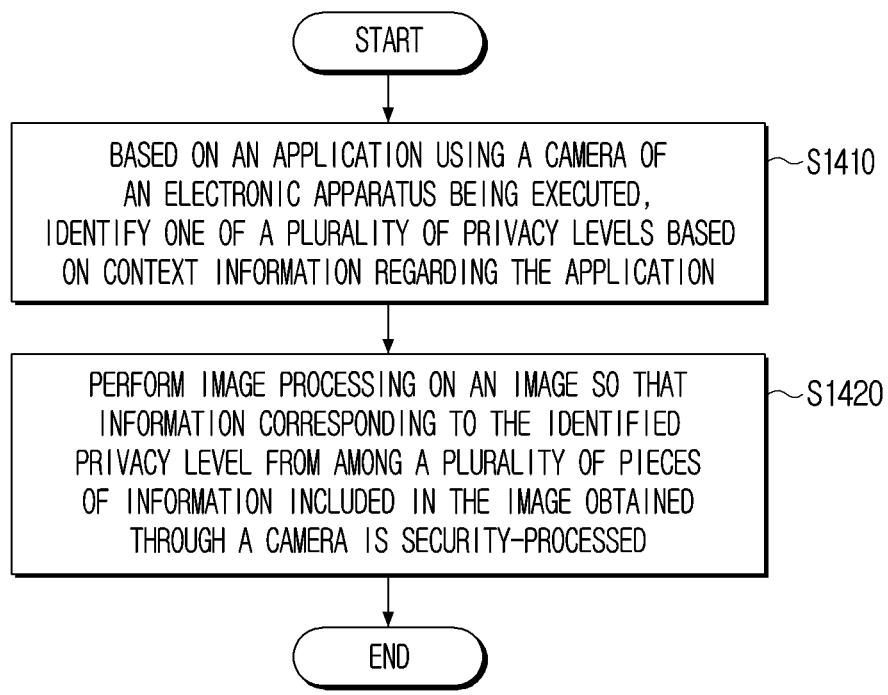
FIG. 14 is a flowchart provided to explain a controlling method of an electronic apparatus according to an embodiment.

FIG. 14 is a flowchart provided to explain a controlling method of an electronic apparatus according to an embodiment.

Firstly, if an application using a camera of an electronic apparatus is executed, one of a plurality of privacy levels is identified based on context information related to the application (S1410). Subsequently, an image is processed such that information corresponding to the identified privacy level from among a plurality of pieces of information included in the image captured through the camera is processed for security (S1420).

Here, the application may be a video call application, and the identifying (S1410) may comprise identifying a first another user who performs a video call through the video call application and identifying one of a plurality of privacy levels based on information regarding the identified first another user.

In addition, the identifying (S1410) may comprise, if information regarding the first another user is stored in the electronic apparatus, identifying a first privacy level from among a plurality of privacy levels, and if information regarding the first another user is not stored in the electronic apparatus, identifying a second privacy level with more enhanced security than the first privacy level from among a plurality of privacy levels.

Meanwhile, the step of obtaining a plurality of images sequentially through a camera and the step of identifying information regarding a user of the electronic apparatus by analyzing a plurality of images may be further included.

Here, the step of, if a user is not identified in a predetermined number or more of continuous images from among the plurality of images, changing the identified privacy level to a privacy level with more enhanced security that the identified privacy level may be further included.

Meanwhile, the step of, when a user command is input, changing the identified privacy level to a privacy level corresponding to the user command may be further included.

The processing an image (S1420) may comprise blurring a partial area of the image when the identified privacy level is the first privacy level and blurring the entire area of the image when the identified privacy level is the second privacy level with enhanced security than the first privacy level.

Here, the processing an image (S1420) may comprise, if the identified privacy level is the first privacy level, blurring an area excluding the user of the electronic apparatus or an area including the user's personal information in the image.

Meanwhile, the processing an image (S1420) may comprise, if the identified privacy level is equal to or greater than a threshold level, identifying the user of the electronic apparatus and changing an area in which the user is identified to a predetermined image.

According to various embodiments as shown above, the electronic apparatus may process an image for security of information included in the image obtained through a camera and provide the processed image to an application to protect the user's privacy.

In addition, the electronic apparatus may improve user convenience by processing an image differently according to a plurality of privacy levels.

Meanwhile, according to an embodiment, the above-described various embodiments of the disclosure may be implemented as software including instructions that can be stored in machine-readable storage media, which can be read by machine (e.g.: computers). The machine refers to an apparatus that calls instructions stored in a storage medium, and can operate according to the called instructions, and the apparatus may include an electronic apparatus (e.g.: an electronic apparatus (A)) according to the embodiments described in the disclosure. When an instruction is executed by a processor, the processor may perform a function corresponding to the instruction by itself, or by using other components under its control. The instruction may include a code that is generated or executed by a compiler or an interpreter. The storage medium that is readable by machine may be provided in the form of a non-transitory storage medium. Here, the term 'non-transitory' only means that a storage medium does not include signals, and is tangible, but does not indicate whether data is stored in the storage medium semi-permanently or temporarily In addition, according to an embodiment of the disclosure, the method according to the various embodiments described above may be provided while being included in a computer program product. A computer program product refers to a product, and it can be traded between a seller and a buyer. The computer program product can be distributed on-line in the form of a storage medium that is readable by machines (e.g.: a compact disc read only memory (CD-ROM)), or through an application store (e.g.: Play store™). In the case of on-line distribution, at least a portion of the computer program product may be stored in a storage medium such as the server of the manufacturer, the server of the application store, and the memory of the relay server at least temporarily, or may be generated temporarily.

In addition, according to an embodiment, the various embodiments described above may be implemented in a recording medium that can be read by a computer or a similar device using software, hardware, or a combination of software and hardware. In some cases, the embodiments described in the disclosure may be implemented by the processor itself. When implemented as software, the embodiments such as procedures and functions described in the specification may be implemented by separate software modules. Each of the software modules may perform one or more functions and operations described in the specification.

Meanwhile, computer instructions for performing processing operations according to the diverse embodiments of the disclosure described above may be stored in a non-transitory computer-readable medium. The computer instructions stored in the non-transitory computer-readable medium cause a specific device to perform the processing operations of the display apparatus according to the diverse embodiments described above when they are executed by a processor of the specific device. The non-transitory computer-readable medium is not a medium that stores data for a while, such as a register, a cache, a memory, or the like, but means a medium that semi-permanently stores data and is readable by the device. Specific examples of the non-transitory computer-readable medium may include a compact disk (CD), a digital versatile disk (DVD), a hard disk, a Blu-ray disk, a USB, a memory card, a ROM, and the like.

In addition, each of components (for example, modules or programs) according to the diverse embodiments described above may include a single entity or a plurality of entities, and some of the corresponding sub-components described above may be omitted or other sub-components may be further included in the diverse embodiments. Alternatively or additionally, some of the components (for example, the modules or the programs) may be integrated into one entity, and may perform functions performed by the respective corresponding components before being integrated in the same or similar manner. Operations performed by the modules, the programs, or other components according to the diverse embodiments may be executed in a sequential manner, a parallel manner, an iterative manner, or a heuristic manner, at least some of the operations may be performed in a different order or be omitted, or other operations may be added.

Although the embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic apparatus comprising:
a memory to store security information in association with a plurality of privacy levels which are different from each other, respectively;
a camera; and
a processor connected to the memory and the camera and configured to control the electronic apparatus, wherein the processor is further configured to:
based on an application which involves using the camera being executed, identify a privacy level, among the plurality of privacy levels, which corresponds to context information in which the application; continues to be used with the camera;
perform image processing in association with an image obtained through the camera whereby the image processing processes a respective piece of information from a plurality of pieces of information included in the image in a secure manner based on the identified privacy level which changes with the context information as the application continues to be used with the camera subsequent to initial use of the application; and
provide a processed image based on the image processing to the application.

2. The electronic apparatus as claimed in claim 1, wherein the application involves using a video call by a first user; and
wherein the processor is configured to:
identify a second user associated with the video call with the first user through the application; and
identify a respective privacy level among the plurality of privacy levels based on information regarding the identified second user.

3. The electronic apparatus as claimed in claim 2, wherein the memory stores information regarding a plurality of other users;
wherein the processor is configured to:
based on the second user being one of the plurality of other users, identify a first privacy level from among the plurality of privacy levels; and
based on the second user not being one of the plurality of other users, identify a second privacy level with more enhanced security than the first privacy level from among the plurality of privacy levels.

4. The electronic apparatus as claimed in claim 1, wherein the processor is configured to:
obtain a plurality of images sequentially through the camera; and
identify information regarding a user of the electronic apparatus by analyzing the plurality of images.

5. The electronic apparatus as claimed in claim 4, wherein the processor is configured to, based on the user not being identified in consecutive images of a predetermined number or more from among the plurality of images, change the identified privacy level to a privacy level with more enhanced security than the identified privacy level.

6. The electronic apparatus as claimed in claim 1, further comprising:
a user interface,
wherein the processor is configured to, based on a user command being input through the user interface, change the identified privacy level to a privacy level corresponding to the user command.

7. The electronic apparatus as claimed in claim 1, wherein the processor is configured to:
based on the identified privacy level being a first privacy level, blurring a partial area of the image; and
based on the identified privacy level being a second privacy level with more enhanced security than the first privacy level, blurring an entire area of the image.

8. The electronic apparatus as claimed in claim 7, wherein the processor is configured to, based on the identified privacy level being the first privacy level, blurring an area excluding a user of the electronic apparatus in the image or blurring an area including private information of the user.

9. The electronic apparatus as claimed in claim 1, wherein the processor is configured to:
based on the identified privacy level being equal to or greater than a threshold level,
identify a user of the electronic apparatus in the image; and
change an area in which the user is identified to a predetermined image.

10. The electronic apparatus as claimed in claim 1, further comprising:
a microphone,
wherein the processor is configured to, based on the identified privacy level being equal to or greater than a threshold level and a sound of a second another user is input through the microphone, not providing a sound during a time period in which the sound of the second another user is input to the application.

11. A method of controlling an electronic apparatus comprising:
based on an application which involves using a camera being executed, identifying a privacy level, among a plurality of privacy levels, which corresponds to context information in which the application is being used with the camera, the plurality of privacy levels being different from each other;
performing image processing in association with an image obtained through a camera whereby the image processing processes a respective piece of information from among a plurality of pieces of information included in a secure manner based on the identified privacy level which changes with the context information as the application continues to be used with the camera subsequent to initial use of the application; and
providing a processed image based on the image processing to the application.

12. The method as claimed in claim 11, wherein the application involves using a video call application by a first user; and
wherein the identifying comprises:
identifying a second user associated with the video call with the first user through the video call application; and
identifying a respective privacy level among the plurality of privacy levels based on information regarding the identified second user.

13. The method as claimed in claim 12, wherein the identifying comprises:
based on information regarding the second user being stored in the electronic apparatus, identifying a first privacy level from among the plurality of privacy levels; and
based on information regarding the second user not being stored in the electronic apparatus, identifying a second privacy level with more enhanced security than the first privacy level from among the plurality of privacy levels.

14. The method as claimed in claim 11, further comprising:

obtaining a plurality of images sequentially through the camera; and identifying information regarding a user of the electronic apparatus by analyzing the plurality of images.

15. The method as claimed in claim 14, further comprising:

based on the user not being identified in consecutive images of a predetermined number or more from among the plurality of images, changing the identified privacy level to a privacy level with more enhanced security than the identified privacy level.

16. The method as claimed in claim 11, further comprising:

based on a user command being input, changing the identified privacy level to a privacy level corresponding to the user command.

17. The method as claimed in claim 11, wherein the performing comprises:

based on the identified privacy level being a first privacy level, blurring a partial area of the image; and based on the identified privacy level being a second privacy level with more enhanced security than the first privacy level, blurring an entire area of the image.

18. The method as claimed in claim 17, wherein the performing comprises:

based on the identified privacy level being the first privacy level, blurring an area excluding a user of the electronic apparatus in the image or blurring an area including private information of the user.

19. The method as claimed in claim 11, wherein the performing comprises:

based on the identified privacy level being equal to or greater than a threshold level, identify a user of the electronic apparatus in the image; and change an area in which the user is identified to a predetermined image.

\* \* \* \* \*